United States Patent
Patel et al.

(10) Patent No.: US 12,215,869 B2
(45) Date of Patent: Feb. 4, 2025

(54) GAS TURBINE COMBUSTOR FUEL NOZZLE ASSEMBLY AND COMBUSTOR LINER HAVING DILUTION HOLES IN ARRANGEMENTS

(71) Applicant: GENERAL ELECTRIC COMPANY, Schenectady, NY (US)

(72) Inventors: Nayan Vinod Patel, Liberty Township, OH (US); Michael A. Benjamin, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/452,958

(22) Filed: Aug. 21, 2023

(65) Prior Publication Data

US 2024/0280265 A1     Aug. 22, 2024

Related U.S. Application Data

(63) Continuation of application No. 17/725,895, filed on Apr. 21, 2022, now Pat. No. 11,774,100.

(60) Provisional application No. 63/299,619, filed on Jan. 14, 2022.

(51) Int. Cl.

| F23R 3/06 | (2006.01) |
|---|---|
| F23R 3/14 | (2006.01) |
| F23R 3/34 | (2006.01) |
| F23R 3/36 | (2006.01) |
| F02C 7/22 | (2006.01) |
| F23R 3/28 | (2006.01) |

(52) U.S. Cl.
CPC .................. *F23R 3/34* (2013.01); *F23R 3/06* (2013.01); *F23R 3/14* (2013.01); *F23R 3/36* (2013.01); *F02C 7/22* (2013.01); *F23R 3/28* (2013.01); *F23R 3/346* (2013.01)

(58) Field of Classification Search
CPC .... F23R 3/06; F23R 3/28; F23R 3/286; F23R 3/346
See application file for complete search history.

(56) References Cited

U.S. PATENT DOCUMENTS

| 4,054,028 A | 10/1977 | Kawaguchi |
| 4,194,358 A | 3/1980 | Stenger |
| 5,220,795 A | 6/1993 | Dodds et al. |
| 5,289,686 A | 3/1994 | Razdan et al. |
| 5,339,635 A | 8/1994 | Iwai |
| 5,761,907 A | 6/1998 | Pelletier et al. |
| 5,778,676 A | 7/1998 | Johsi et al. |
| 5,862,668 A | 1/1999 | Richardson |
| 5,987,889 A | 11/1999 | Graves et al. |

(Continued)

FOREIGN PATENT DOCUMENTS

| DE | 1800612 A | 10/1968 |
| DE | 102011114928 A1 | 4/2013 |

(Continued)

*Primary Examiner* — William H Rodriguez
(74) *Attorney, Agent, or Firm* — McGarry Bair PC (57) ABSTRACT

A turbine engine can include a compressor section, a combustion section, and a turbine section in serial flow arrangement. A combustor in the combustion section can include a combustion chamber, a fuel supply fluidly coupled to the combustion chamber, and a fuel nozzle assembly. The fuel nozzle assembly can include an air flow passage and a fuel flow passage.

20 Claims, 5 Drawing Sheets

(56) References Cited

U.S. PATENT DOCUMENTS

| | | | |
|---|---|---|---|
| 6,070,412 A * | 6/2000 | Ansart | F23R 3/06 60/746 |
| 6,101,814 A | 8/2000 | Hoke et al. | |
| 6,192,689 B1 | 2/2001 | Feitelberg et al. | |
| 6,260,359 B1 | 7/2001 | Monty et al. | |
| 6,279,323 B1 | 8/2001 | Monty et al. | |
| 6,418,726 B1 | 7/2002 | Foust et al. | |
| 6,460,344 B1 | 10/2002 | Steinthorsson et al. | |
| 6,513,331 B1 * | 2/2003 | Brown | F23R 3/06 60/754 |
| 8,739,550 B2 | 6/2014 | Etemad et al. | |
| 8,806,848 B2 | 8/2014 | Koizumi et al. | |
| 8,943,833 B2 | 2/2015 | Tuthill et al. | |
| 10,436,114 B2 * | 10/2019 | Patel | F23R 3/002 |
| 10,641,176 B2 | 5/2020 | Berry et al. | |
| 11,692,708 B1 * | 7/2023 | Sampath | F23R 3/06 60/748 |
| 2003/0027093 A1 | 2/2003 | Kutter et al. | |
| 2004/0000146 A1 | 1/2004 | Inoue | |
| 2004/0206091 A1 | 10/2004 | Yee et al. | |
| 2006/0130486 A1 * | 6/2006 | Danis | F23R 3/002 60/752 |
| 2007/0137207 A1 | 6/2007 | Mancini et al. | |
| 2007/0227149 A1 | 10/2007 | Biebel et al. | |
| 2008/0010992 A1 * | 1/2008 | Patterson | F23R 3/06 60/752 |
| 2008/0104961 A1 | 5/2008 | Bunker | |
| 2009/0003998 A1 * | 1/2009 | Woodcock | F01D 9/026 415/205 |
| 2009/0044538 A1 | 2/2009 | Pellitier et al. | |
| 2009/0142548 A1 * | 6/2009 | Patterson | C23C 4/01 428/137 |
| 2009/0256007 A1 | 10/2009 | McMasters et al. | |
| 2010/0077763 A1 | 4/2010 | Alkabie | |
| 2010/0089066 A1 | 4/2010 | Mina | |
| 2010/0095649 A1 | 4/2010 | Blouch et al. | |
| 2011/0048024 A1 * | 3/2011 | Snyder | F23R 3/50 60/754 |
| 2012/0186222 A1 * | 7/2012 | Commaret | F23R 3/26 60/39.827 |
| 2012/0291442 A1 * | 11/2012 | Commaret | F23R 3/10 60/754 |
| 2013/0029277 A1 | 1/2013 | Koizumi et al. | |
| 2013/0276450 A1 * | 10/2013 | Baruah | F23R 3/06 60/754 |
| 2013/0327048 A1 * | 12/2013 | Cunha | F23R 3/06 60/754 |
| 2013/0327049 A1 * | 12/2013 | Cunha | F23R 3/007 60/754 |
| 2013/0327056 A1 | 12/2013 | Cunha et al. | |
| 2013/0327057 A1 * | 12/2013 | Cunha | F23R 3/002 60/754 |
| 2013/0333387 A1 * | 12/2013 | Leblond | F23R 3/002 60/722 |
| 2014/0083100 A1 | 3/2014 | Cunha et al. | |
| 2014/0260257 A1 * | 9/2014 | Rullaud | F23R 3/002 60/722 |
| 2016/0223200 A1 * | 8/2016 | Singh | F23R 3/045 |
| 2018/0283689 A1 * | 10/2018 | Wang | F23R 3/06 |
| 2019/0085767 A1 * | 3/2019 | Vise | F23R 3/002 |
| 2021/0190317 A1 * | 6/2021 | Gringhaus | F02C 7/24 |
| 2022/0106928 A1 | 4/2022 | Armbruster et al. | |
| 2022/0290861 A1 * | 9/2022 | Chiranthan | F23R 3/002 |
| 2022/0325891 A1 * | 10/2022 | Kediya | F23R 3/06 |
| 2023/0044804 A1 * | 2/2023 | Hu | F23R 3/002 |
| 2023/0194088 A1 * | 6/2023 | Giridharan | F23R 3/346 60/752 |
| 2023/0213191 A1 * | 7/2023 | Vukanti | F23R 3/28 60/752 |

FOREIGN PATENT DOCUMENTS

| | | |
|---|---|---|
| DE | 102019110258 A1 | 10/2020 |
| EP | 2706295 A1 | 3/2016 |
| EP | 3879178 A1 | 9/2021 |
| GB | 635946 | 4/1950 |
| WO | 2013050105 A1 | 4/2013 |

* cited by examiner

GAS TURBINE COMBUSTOR FUEL NOZZLE ASSEMBLY AND COMBUSTOR LINER HAVING DILUTION HOLES IN ARRANGEMENTS

CROSS-REFERENCE TO RELATED APPLICATION(S)

This application claims priority to and the benefit of U.S. patent application Ser. No. 17/725,895, filed Apr. 21, 2022, now U.S. Pat. No. 11,774,100, issued Oct. 3, 2023, which claims priority to and the benefit of U.S. Provisional Patent Application No. 63/299,619, filed Jan. 14, 2022, both of which are incorporated herein by reference in their entirety.

TECHNICAL FIELD

The present subject matter relates generally to a combustor, for a turbine engine, having a fuel nozzle assembly, and more specifically to a fuel nozzle assembly having a multiple-injection arrangement.

BACKGROUND

Turbine engines are driven by a flow of combustion gases passing through the engine to rotate a multitude of turbine blades. A combustor can be provided within the turbine engine and is fluidly coupled with a turbine into which the combusted gases flow.

In a typical turbine engine, air and fuel are supplied to a combustion chamber, mixed, and then ignited to produce hot gas. The hot gas is then fed to a turbine where it rotates a turbine to generate power.

DETAILED DESCRIPTION

Aspects of the disclosure described herein are directed to a combustor with a fuel nozzle assembly. For purposes of illustration, the present disclosure will be described with respect to a turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" may be used herein to mean that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
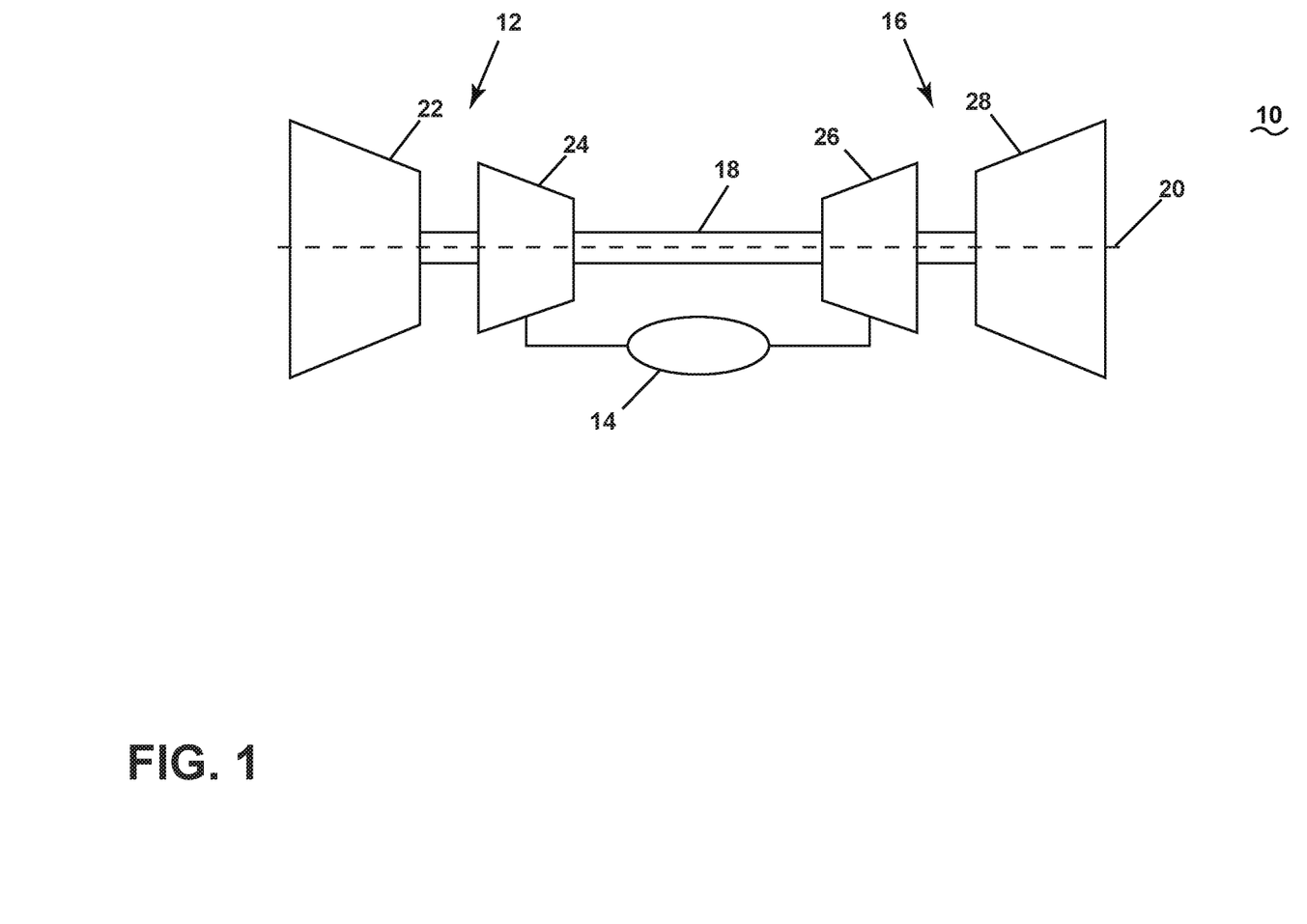
FIG. 1 is a schematic cross-sectional view of a turbine engine having a compression section, a combustion section, and a turbine section in accordance with various aspects described herein.

FIG. 1 is a schematic view of a turbine engine 10. As a non-limiting example, the turbine engine 10 can be used within an aircraft. The turbine engine 10 can include, at least, a compressor section 12, a combustion section 14, and a turbine section 16. A drive shaft 18 rotationally couples the compressor section 12 and turbine section 16, such that rotation of one affects the rotation of the other, and defines a rotational axis 20 for the turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft (not illustrated) and an HP drive shaft (not illustrated). The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the turbine engine 10. It will be appreciated that the representation of the compressor section 12 is merely schematic and that there can be any number of blades, vanes and stages. Further, it is contemplated that there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated that there can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14.

During operation of the turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and an exhaust gas is ultimately discharged from the turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the turbine engine 10.

Figure 2:
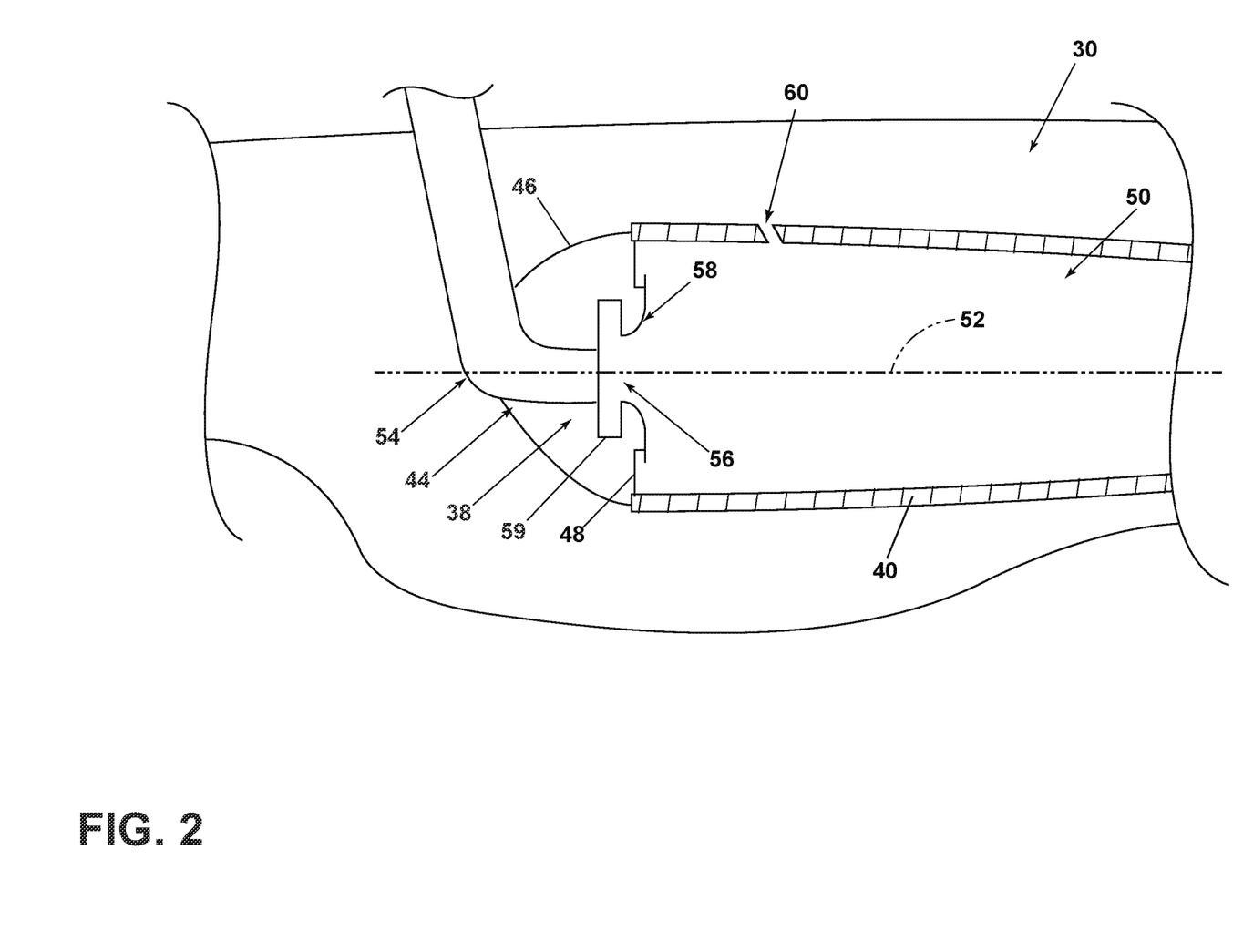
FIG. 2 is a cross-sectional view of a generic combustor that can be utilized in the turbine engine of FIG. 1.

FIG. 2 depicts a cross-sectional view of a generic combustor 30 suitable for use in the combustion section 14 of FIG. 1. The combustor 30 can include a fuel nozzle assembly 38 for providing fuel to the combustor 30. In some examples, the fuel nozzle assembly 38 can include an annular arrangement of fuel nozzles. It should be appreciated that the fuel nozzle assemblies 38 can be organized in any suitable arrangement, pattern, grouping, or the like. The combustor 30 can have a can, can-annular, or annular arrangement depending on the type of engine in which the combustor 30 is located. The combustor 30 can also include a combustor liner 40. In some examples, the combustor liner 40 can have an annular structure about the combustor 30. In some examples, the combustor liner 40 can include multiple segments or portions collectively forming the combustor liner 40.

A dome assembly 44 can also be provided in the combustor 30. The dome assembly 44 can include a dome 46 and a deflector 48. The combustor liner 40 and dome assembly 44 can collectively at least partially define a combustion chamber 50 about a longitudinal axis 52. At least one fuel supply 54 can be fluidly coupled to the combustion chamber 50 to supply fuel to the combustor 30. The fuel can include any suitable fuel, including hydrocarbon fuel or hydrogen fuel in non-limiting examples.

The fuel supply 54 can be disposed within the dome assembly 44 to define an overall fuel outlet 56 to the combustion chamber 50. A flare cone 58 can be provided downstream of the fuel supply 54 in some examples. A swirler 59 can also be provided at the fuel nozzle assemblies 38 to swirl incoming air in proximity to fuel exiting the fuel supply 54 and provide a homogeneous mixture of air and fuel entering the combustor 30.

A set of dilution holes 60 can be provided in the combustor liner 40 and configured to direct air into the combustion chamber 50 for temperature control, flame shaping, fuel-air mixing, or the like. While a single dilution hole is illustrated, any number can be provided in the set of dilution holes 60. The set of dilution holes 60 can have any suitable patterning or arrangement over the combustor liner 40, including linear rows, irregular groups, variable hole diameters, or the like, or combinations thereof.

Figure 3:
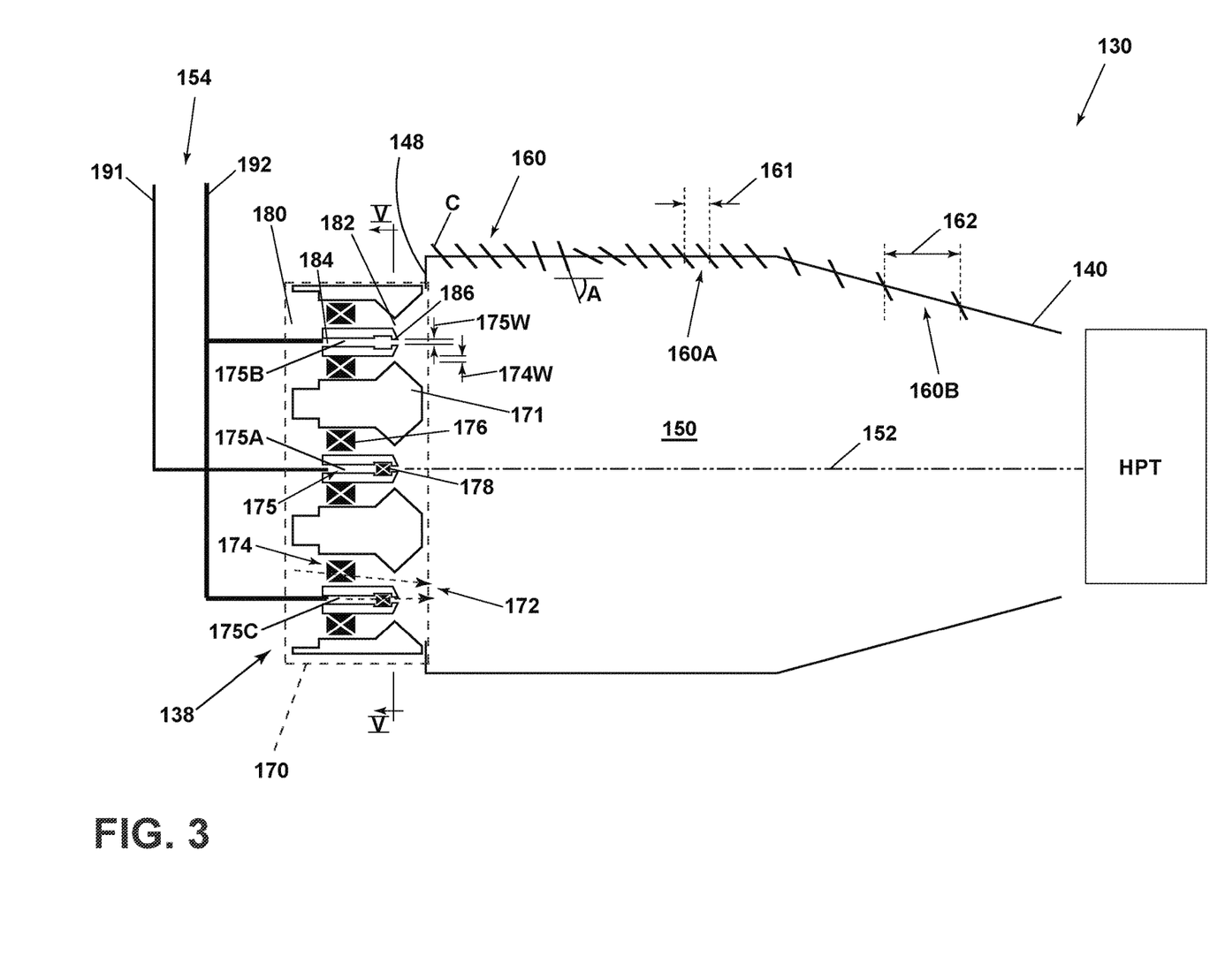
FIG. 3 is a cross-sectional view of another combustor that can be utilized in the turbine engine of FIG. 1 having a fuel nozzle assembly in accordance with various aspects described herein.

Turning to FIG. 3, a portion of another combustor 130 is shown that can be utilized in the combustion section 14 (FIG. 1). The combustor 130 is similar to the combustor 30 (FIG. 2); therefore, like parts will be described with like numerals increased by 100, with it being understood that the description of the like parts of the combustor 30 applies to the combustor 130, except where noted.

The combustor 130 can extend along a longitudinal axis 152 and include a fuel nozzle assembly 138, a combustor liner 140, a deflector 148, a combustion chamber 150, a fuel supply 154, and a set of dilution holes 160. In the example shown, the set of dilution holes 160 is schematically illustrated wherein dilution hole centerlines (denoted "C") are shown extending through the combustor liner 140. It will be understood that the set of dilution holes 160 can form hollow apertures extending through the combustor liner 140. Such apertures can have any suitable geometric profile, including round, elliptical, oval, symmetric, asymmetric, irregular, or the like. The set of dilution holes 160 is illustrated over an upper portion of the combustor liner 140 for visual clarity. It will be understood that the set of dilution holes 160 can be provided on any portion of the combustor liner 140, and can also have any arrangement, number, or pattern, including in an annular arrangement about the combustor liner 140.

One difference compared to the combustor 30 is that the set of dilution holes 160 can have a variable axial spacing distance along the longitudinal axis 152. In one example, a first axial distance 161 is illustrated between a first pair of dilution holes 160A in the set of dilution holes 160, and a second axial distance 162 is illustrated between a second pair of dilution holes 160B in the set of dilution holes 160. The second axial distance 162 can be larger than the first axial distance 161 in some examples. The first pair of dilution holes 160A can be positioned axially forward of the second pair of dilution holes 160B. In some examples, an axial distance between adjacent dilution holes in the set of dilution holes 160 can continually increase in a downstream direction through the combustor 30. It is also contemplated that least one of an axial distance or a circumferential distance between adjacent dilution holes in the set of dilution holes 160 can be a predetermined amount with respect to a dilution hole diameter in the set of dilution holes 160. The axial distance or the circumferential distance between adjacent dilution holes can be larger than the dilution hole diameter, or twice the dilution hole diameter, or between 2-100 times the dilution hole diameter, in non-limiting examples.

Another difference compared to the combustor 30 is that the set of dilution holes 160 can form constant or varied angles with respect to the combustor liner 140. One exemplary angle (denoted "A") is indicated for a dilution hole in the set of dilution holes 160. The angle A can be nonorthogonal to the longitudinal axis 152, including between 10-90 degrees in some examples.

Another difference compared to the combustor 30 is that the deflector 148 can have a flat, or generally flat, geometric profile. The deflector 148 can also include a material having a high temperature capability. As used herein, a material's "temperature capability" will refer to the highest operating temperature contemplated for use for that material, wherein subjecting the material to temperatures higher than its temperature capability can cause effects such as oxidation, fatigue, plastic deformation, or melting of the material. In some examples, the deflector 148 can include ceramic matrix composite (CMC) or monolithic ceramic.

Another difference compared to the combustor 30 is that the fuel nozzle assembly 138 can include an air-fuel nozzle 170. The air-fuel nozzle 170 can include a body 171 having one or more nozzle outlets 172 in some examples. In another non-limiting example, multiple air-fuel nozzles 170 can be provided, with each air-fuel nozzle 170 having a body 171 with a singular nozzle outlet 172. Any number of air-fuel nozzles 170 and nozzle outlets 172 can be provided. The nozzle outlets 172 can have any suitable arrangement within the combustor 130.

The nozzle outlets 172 can be configured to inject both air and fuel into the combustion chamber 150. In the example shown, the air-fuel nozzle 170 includes multiple air flow passages 174 and fuel flow passages 175 extending through the body 171. The air flow passage 174 can at least partially circumscribe the fuel flow passage 175. Each air flow passage 174 can extend between an air inlet 180 and an air outlet 182. Each fuel flow passage 175 can extend between a fuel inlet 184 and a fuel outlet 186. Each of the air outlet 182 and fuel outlet 186 can be fluidly coupled to the combustion chamber 150. The air flow passage 174 and the fuel flow passage 175 can fluidly combine at the nozzle outlet 172 by way of the air outlet 182 and fuel outlet 186. In addition, the fuel outlet 186 can be positioned upstream of a downstream end of the body 171 with respect to the longitudinal axis 152.

The air flow passage 174 can define an air passage width 174W. The fuel flow passage 175 can define a fuel passage width 175W. Either or both of the air passage width 174W or fuel passage width 175W can be constant or variable along the longitudinal axis 152. In one example, the air passage width 174W can reduce in size along at least a portion of the air flow passage 174 when moving downstream along the longitudinal axis 152. In one example, the fuel passage width 175W can increase, and then decrease, in size when moving downstream along the longitudinal axis 152.

At least one swirler can be provided in at least one of the fuel flow passage 175 or the air flow passage 174 upstream of the nozzle outlet 172. In some examples, a fuel swirler 178 can be provided in the fuel flow passage 175. In such a case, the fuel swirler 178 can be configured to swirl incoming fuel upstream of the nozzle outlet 172. In some examples, incoming fuel can flow directly through the fuel flow passage 175 and into the combustion chamber 150 without use of a fuel swirler (e.g. a jet of fuel).

In some examples, an air swirler 176 can be provided in the air flow passage 174. In such a case, the air swirler 176 can be configured to swirl incoming air upstream of the nozzle outlet 172. In some examples, incoming air can flow directly through the air flow passage 174 and into the combustion chamber 150 without use of an air swirler (e.g. a jet of air).

Still another difference compared to the combustor 30 is that fuel can be supplied to the fuel nozzle assembly 138 in multiple fuel supply conduits. In the example shown, the fuel supply 154 includes a first fuel supply conduit 191 and a second fuel supply conduit 192 although any number of fuel supply conduits can be provided. The first fuel supply conduit 191 can supply fuel to at least a first fuel flow passage 175A and the second fuel supply conduit 192 can supply fuel to at least a second fuel flow passage 175B. In the non-limiting example shown, the first fuel supply conduit 191 can supply fuel to the first fuel flow passage 175A and the second fuel supply conduit 192 can supply fuel to the second fuel flow passage 175B as well as a third fuel flow passage 175C. The first fuel supply conduit 191 and the second fuel supply conduit 192 can supply fuel simultaneously or at different time intervals in some examples. In some other non-limiting examples the first fuel supply conduit 191 and second fuel supply conduit 192 can also supply the same fuel, different fuels, the same fuel mixture, or different fuel mixtures, to the fuel inlets 184.

In some examples, a controller can independently control a supply of fuel to the first fuel supply conduit 191 and the second fuel supply conduit 192. Such an independent control can include supply of separate fuel types, separate fuel flow rates, separate fuel supply timings, or the like, to the first fuel supply conduit 191 and the second fuel supply 192. In one non-limiting example, a full authority digital engine controller (FADEC) can be in signal communication with one or more fuel sources. The FADEC can controllably operate the one or more fuel sources to supply fuel to at least one of first fuel supply conduit 191 or the second fuel supply conduit 192. A controller can also supply fuel independently to selected nozzle outlets 172, or to selected groups of nozzle outlets 172, in some non-limiting examples.

Figure 4:
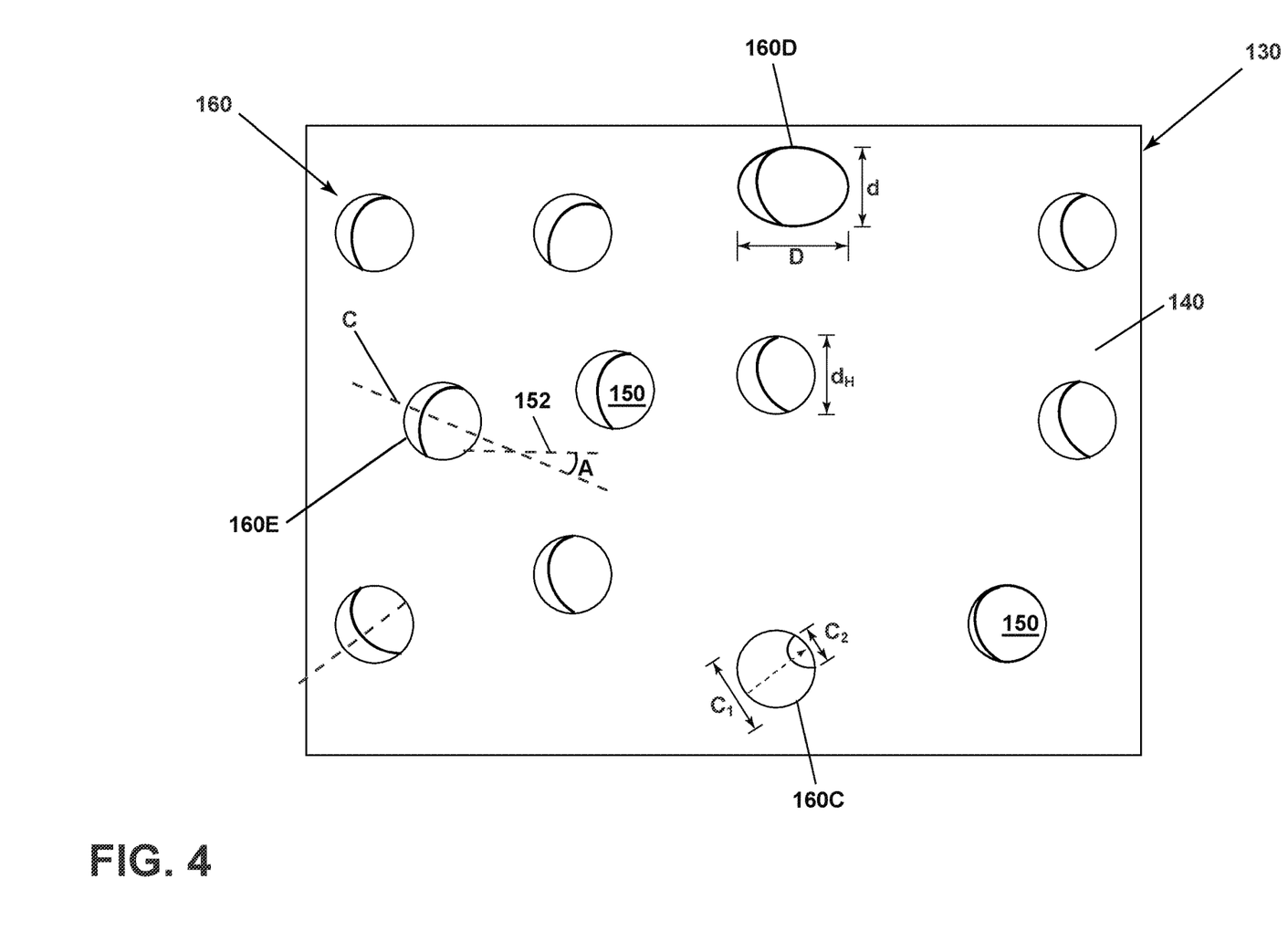
FIG. 4 is a top view of a portion of the combustor of FIG. 3 illustrating a set of dilution holes.

FIG. 4 illustrates a top view of the combustor 130 with the set of dilution holes 160 shown in further detail. It will be understood that the set of dilution holes 160 can include identical dilution holes, differing dilution holes, a subset of identical dilution holes, a subset of differing dilution holes, or the like.

Some exemplary dilution hole centerlines C are indicated in dashed line. It is further contemplated that the centerline C can be formed in a circumferential direction in some examples, such as to provide a swirling flow within the combustion chamber 150. The angle A can also be formed in an axial direction along the longitudinal axis 152 in some examples, and configured to reduce shear stress or mixing when introducing air into the combustion chamber 150. In some examples the angle A can be directed in a radially inboard direction, such as to provide flame shaping or to direct fuel or flame away from the combustor liner 140.

In some examples, the set of dilution holes 160 can include a channel geometry with a decreasing cross-sectional area in a downstream direction to provide for fast-velocity dilution jets entering the combustion chamber 150. One exemplary dilution hole 160C in the set of dilution holes 160 is shown having a first cross-sectional area (denoted "$C_1$") and a second cross-sectional area (denoted "$C_2$"). A dashed arrow indicates a flow direction through the dilution hole 160C. The second cross-sectional area $C_2$ can be smaller than the first cross-sectional area $C_1$, providing for a decreasing cross-sectional area within the dilution hole 160C in the downstream direction.

Another exemplary dilution hole 160E in the set of dilution holes 160 is illustrated with its centerline C. The centerline C can form the angle A with the longitudinal axis 152 as shown. The angle A can be between 10-90 degrees in some examples. It should also be understood that the angle A can be formed radially with respect to the longitudinal axis 152, or circumferentially about the longitudinal axis 152, or a combination thereof.

One exemplary hole diameter (denoted "$d_H$") is indicated for a dilution hole in the set of dilution holes 160. It is also contemplated that the set of dilution holes 160 can be elongated, elliptical, asymmetric, non-circular, or the like. Another exemplary dilution hole 160D in the set of dilution holes 160 is shown having an elliptical geometric profile. The dilution hole 160D can define a major diameter D (denoted "D") and a minor diameter d (denoted "d"). In some non-limiting examples, a ratio of the major diameter D to the minor diameter d can be between 1-5, or between 1-3, or between 1-2.

The set of dilution holes 160 can also include hole diameters configured to form micro-dilution jets into the combustion chamber 150. In some examples, the set of dilution holes 160 can include micro-dilution jets formed by larger hole diameters compared to traditional combustors. In a non-limiting example, any of the hole diameter $d_H$, the major diameter D, or the minor diameter d can be between 1 mm and 3 mm. Such micro-dilution jets can have a range of relative airflows between 0.01-0.25 compared to a single conventional dilution hole airflow. In a non-limiting example, micro-dilution jets through a range of 4-100 micro-dilution holes in the set of dilution holes 160 can collectively form the same airflow relative to a typical airflow through one conventional dilution hole in a traditional combustor. The micro-dilution jets can also have a pressure drop between 1-5% of the combustor inlet pressure in some examples.

The set of dilution holes 160 can be configured, arranged, selected, or the like to allow for jet penetration into the combustion chamber 150. In one non-limiting example, the set of dilution holes 160 can allow jet penetration of 2-5 times a boundary layer thickness adjacent the combustor liner 140. In this manner, high-velocity jets, higher diameter dilution holes, and larger pressure drops can form a larger velocity momentum within the combustion chamber 150 and keep hydrogen away from the combustor liner 140 during operation.

Figure 5:
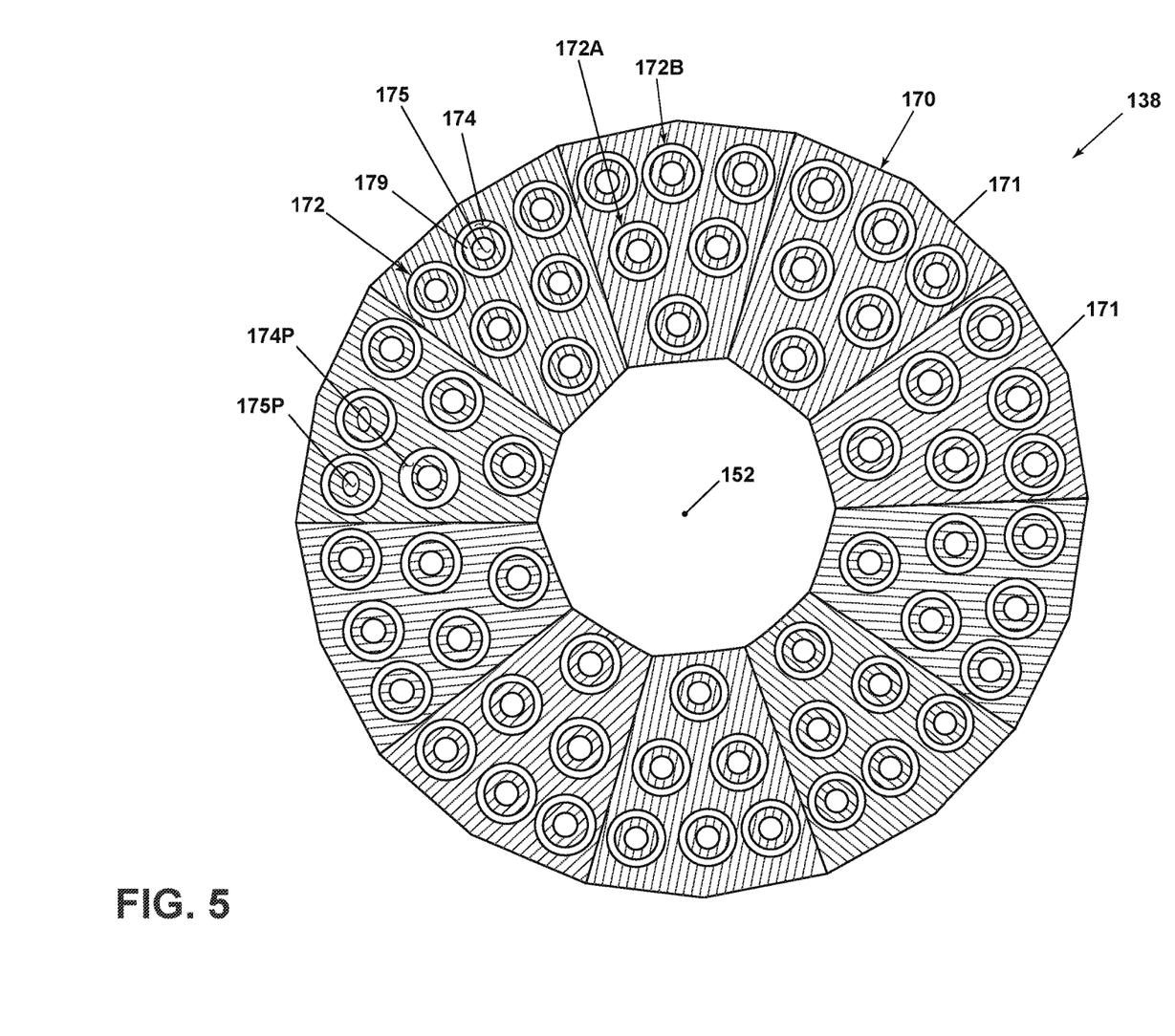
FIG. 5 is a cross-sectional view of the fuel nozzle assembly of FIG. 3 along line V-V.

Turning to FIG. 5, a cross-sectional view of the air-fuel nozzle 170 is shown along line V-V of FIG. 3, looking in the forward direction along the longitudinal axis 152. The air-fuel nozzle 170 is schematically illustrated in one exemplary configuration with ten bodies 171 in an annular arrangement about the longitudinal axis 152, and with each body 171 including six nozzle outlets 172, although this need not be the case. Any number of bodies 171 and nozzle outlets 172 can be provided. In some examples, the air-fuel nozzle 170 can include a singular or unitary body 171 having multiple nozzle outlets 172. In some examples, the air-fuel nozzle 170 can include multiple bodies 171 each having a single nozzle outlet 172. In some examples, the air-fuel nozzle 170 can include multiple bodies 171 having differing numbers of nozzle outlets 172. Nozzle outlets 172 can optionally be integrated into or unitarily formed with the air-fuel nozzle 170 in some examples. Nozzle outlets 172 can also be provided at the center of the air-fuel nozzle 170 in some examples.

A dividing wall 179 is shown forming the annular air flow passage 174 separated from the fuel flow passage 175. Any arrangement, shape, or positioning can be used for the air flow passage 174 and fuel flow passage 175 to form the nozzle outlet 172. While the air flow passage 174 and fuel flow passage 175 are generally illustrated with circular cross sections, the air flow passage 174 and fuel flow passage 175 can have any suitable geometric profile including oval, square, annular, segmented, symmetric, asymmetric, or irregular, in non-limiting examples. One exemplary air flow passage 174P is illustrated with an elongated or oval geometric profile. One exemplary fuel flow passage 175P is illustrated with a geometric profile with a non-constant passage width. Any geometric profile is contemplated.

In addition, the nozzle outlets 172 can be arranged circumferentially about the longitudinal axis 152. The nozzle outlets 172 can also be arranged in multiple concentric rings in some examples. In the non-limiting example shown, a first nozzle outlet 172A can be circumferentially offset from a second nozzle outlet 172B. Put another way, the first nozzle outlet 172A can be radially unaligned with the second nozzle outlet 172B with respect to the longitudinal axis 152. In this manner, a plurality of nozzle outlets 172, a plurality of annular air flow passages 174, and a plurality of fuel flow passages 175 can be provided in the air-fuel nozzle 170.

With general reference to FIGS. 3-5, during operation, fuel and air can be supplied to the air-fuel nozzles 170. Either or both of the supplied air or fuel can be swirled along the air flow passage 174 and fuel flow passage 175 upstream of the nozzle outlet 172. In this manner, fuel and air can be supplied, mixed, and injected into the combustion chamber 150 through multiple injection points in any suitable pattern or arrangement. In addition, air can be supplied to the combustion chamber 150 by way of the set of dilution holes 160. The set of dilution holes 160 can provide micro-dilution jets into the combustion chamber 150 in multiple directions, including axially, circumferentially, or combinations thereof.

The above described aspects provide for multiple benefits, including the multipoint injection of air and fuel into the combustion chamber. Such multipoint injection can provide for shaping and positioning of the combustion flame within the combustion chamber. In addition, the micro-dilution jets formed by the larger diameter dilution holes provides for higher velocity air entering the combustion chamber with a larger pressure drop. The micro-dilution jets formed by the dilution holes can have a larger velocity momentum to direct fuel away from the combustor liner and for temperature control or fuel mixing purposes. In addition, the micro-dilution jets described herein can also minimize fuel dispersion upstream of the liner.

Aspects of the present disclosure, including the staged, multipoint injection of fuel and air into the combustion chamber, can further provide for a shortened combustor length. In some examples, a length of the combustor can be reduced by 50% compared to a traditional combustor.

Aspects of the disclosure can further provide for a reduction in combustor length compared to traditional combustors. In one example, the combustor length can be reduced by 50% compared to a traditional combustor. Aspects of the disclosure additionally provide for an improved profile or pattern factor for combustion gases entering the turbine section downstream. Front-loaded, multi-point, direct injection can use the annular combustor geometry for a lean fuel-air mixture to deliver reduced emissions (including $NO_x$) and improvement in mixing to beneficially impact profile/pattern factor.

In addition, the use of a flat deflector with high thermal capability material, such as CMC, can provide for reduction in hardware stress in the combustion environment. Shaped multi-hole on the face of the deflector may further augment thermal capability of the combustor. Fuel staging among multi-point, direct injection swirlers can further help optimize engine operability and improve emission control.

While described with respect to a turbine engine, it should be appreciated that aspects of the disclosure can have general applicability to any combustor. Aspects of the disclosure described herein can also be applicable to engines with propeller sections, fan and booster sections, turbojet engines, or turboshaft engines, in non-limiting examples.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether the new embodiments are expressly described. All combinations or permutations of features described herein are covered by this disclosure.

Further aspects of the disclosure are provided by the following clauses:

A turbine engine comprising a compressor section, a combustion section, and a turbine section in serial flow arrangement, and the combustion section having a combustor comprising a combustor liner at least partially defining a combustion chamber, a fuel supply fluidly coupled to the combustion chamber, and a fuel nozzle assembly comprising a body having a nozzle outlet fluidly coupled to the combustion chamber, an air flow passage located within the body and having an air outlet fluidly coupled to the nozzle outlet, a fuel flow passage located within the air flow passage and having a fuel outlet fluidly coupled to the nozzle outlet and to the air outlet, wherein the fuel flow passage and the body define an annular cross section for the air flow passage, and at least one swirler located in at least one of the fuel flow passage or the air flow passage upstream of the nozzle outlet.

The turbine engine of any preceding clause, wherein the at least one swirler comprises a fuel swirler located in the fuel flow passage.

The turbine engine of any preceding clause, wherein the at least one swirler comprises an air swirler located in the air flow passage.

The turbine engine of any preceding clause, wherein the at least one swirler comprises a fuel swirler located in the fuel flow passage and an air swirler located in the air flow passage.

The turbine engine of any preceding clause, further comprising a second fuel flow passage extending through the body and a second air flow passage annularly surrounding the second fuel flow passage and extending through the body.

The turbine engine of any preceding clause, further comprising multiple air flow passages extending through the body and multiple fuel flow passages located within the multiple air flow passages.

The turbine engine of any preceding clause, wherein the fuel supply comprises a first fuel supply conduit and a second fuel supply conduit, with the first fuel supply conduit fluidly coupled to the fuel flow passage and the second fuel supply conduit fluidly coupled to a second fuel flow passage.

The turbine engine of any preceding clause, further comprising a hydrogen fuel supplied by the first fuel supply conduit to the fuel flow passage and a hydrocarbon fuel supplied by the second fuel supply conduit to the second fuel flow passage.

The turbine engine of any preceding clause, further comprising a hydrogen fuel supplied by the first fuel supply conduit to one of the fuel flow passage or the second fuel flow passage, and a hydrocarbon fuel supplied by the second fuel supply conduit to the other of the fuel flow passage or the second fuel flow passage.

The turbine engine of any preceding clause, further comprising a plurality of nozzle outlets including the nozzle outlet.

The turbine engine of any preceding clause, further comprising a plurality of annular air flow passages including the air flow passage.

The turbine engine of any preceding clause, further comprising a plurality of fuel flow passages including the fuel flow passage and located within the corresponding plurality of air flow passages, wherein the plurality of nozzle outlets are arranged circumferentially about the body.

The turbine engine of any preceding clause, further comprising multiple nozzle outlets arranged circumferentially about the body.

The turbine engine of any preceding clause, further comprising a first nozzle outlet and a second nozzle outlet, with the first nozzle outlet radially unaligned with the second nozzle outlet with respect to a longitudinal axis extending through the combustor.

The turbine engine of any preceding clause, further comprising multiple bodies comprising multiple nozzle outlets having corresponding multiple air flow passages, and also comprising multiple fuel flow passages located within the corresponding multiple air flow passages.

The turbine engine of any preceding clause, further comprising a set of dilution holes in the combustor liner, wherein a first pair of adjacent dilution holes in the set of dilution holes are spaced to define a first axial distance with respect to a longitudinal axis extending through the combustor, and wherein a second pair of adjacent dilution holes in the set of dilution holes are spaced to define a second axial distance with respect to the longitudinal axis, wherein the second axial distance is larger than the first axial distance.

The turbine engine of any preceding clause, wherein the first pair of adjacent dilution holes is positioned axially forward of the second pair of adjacent dilution holes with respect to the longitudinal axis.

The turbine engine of any preceding clause, wherein a dilution hole in the set of dilution holes defines a major diameter and a minor diameter, with the minor diameter being smaller than the major diameter.

The turbine engine of any preceding clause, wherein a dilution hole in the set of dilution holes defines an angle with respect to the longitudinal axis, with the angle being between 10-90 degrees.

The turbine engine of any preceding clause, wherein a dilution hole in the set of dilution holes comprises a cross-sectional area that decreases along a downstream direction.

The turbine engine of any preceding clause, further comprising a deflector in the combustor having a flat geometric profile.

The turbine engine of any preceding clause, wherein the deflector comprises a material having a high temperature capability.

The turbine engine of any preceding clause, wherein the deflector comprises at least one of ceramic or ceramic matrix composite.

A turbine engine comprising a compressor section, a combustion section, and a turbine section in serial flow arrangement, and the combustion section having a combustor comprising a combustor liner at least partially defining a combustion chamber, and a set of dilution holes in the combustor liner, wherein a first pair of adjacent dilution holes in the set of dilution holes are spaced to define a first axial distance with respect to a longitudinal axis extending through the combustor, and wherein a second pair of adjacent dilution holes in the set of dilution holes are spaced to define a second axial distance with respect to the longitudinal axis, wherein the second axial distance is larger than the first axial distance.

The turbine engine of any preceding clause, wherein the first pair of adjacent dilution holes is positioned axially forward of the second pair of adjacent dilution holes with respect to the longitudinal axis.

The turbine engine of any preceding clause, wherein a dilution hole in the set of dilution holes defines a major diameter and a minor diameter, with the minor diameter being smaller than the major diameter.

The turbine engine of any preceding clause, wherein a dilution hole in the set of dilution holes defines an angle with respect to the longitudinal axis, with the angle being between 10-90 degrees.

The turbine engine of any preceding clause, wherein a dilution hole in the set of dilution holes comprises a cross-sectional area that decreases along a downstream direction.

A combustor for a turbine engine, comprising a combustor liner at least partially defining a combustion chamber, a fuel supply fluidly coupled to the combustion chamber, and a fuel nozzle assembly comprising a body having a nozzle outlet fluidly coupled to the combustion chamber, an air flow passage located within the body and having an air outlet fluidly coupled to the nozzle outlet, a fuel flow passage located within the air flow passage and having a fuel outlet fluidly coupled to the nozzle outlet and to the air outlet, wherein the fuel flow passage and the body define an annular cross section for the air flow passage, and at least one swirler located in at least one of the fuel flow passage or the air flow passage upstream of the nozzle outlet.

The combustor of any preceding clause, wherein the at least one swirler comprises a fuel swirler located in the fuel flow passage.

The combustor of any preceding clause, wherein the at least one swirler further comprises an air swirler located in the air flow passage.

The combustor of any preceding clause, wherein the at least one swirler comprises a fuel swirler located in the fuel flow passage.

The combustor of any preceding clause, wherein the at least one swirler comprises an air swirler located in the air flow passage.

The combustor of any preceding clause, further comprising a second fuel flow passage extending through the body and a second air flow passage annularly surrounding the second fuel flow passage and extending through the body.

The combustor of any preceding clause, wherein the fuel supply comprises a first fuel supply conduit and a second fuel supply conduit, with the first fuel supply conduit fluidly coupled to the fuel flow passage and the second fuel supply conduit fluidly coupled to the second fuel flow passage.

The combustor of any preceding clause, further comprising a hydrogen fuel supplied by the first fuel supply conduit to the fuel flow passage and a hydrocarbon fuel supplied by the second fuel supply conduit to the second fuel flow passage.

The combustor of any preceding clause, further comprising a hydrogen fuel supplied by the first fuel supply conduit to one of the fuel flow passage or the second fuel flow passage, and a hydrocarbon fuel supplied by the second fuel supply conduit to the other of the fuel flow passage or the second fuel flow passage.

The combustor of any preceding clause, further comprising a plurality of nozzle outlets including the nozzle outlet, a plurality of annular air flow passages including the air flow passage, and a plurality of fuel flow passages including the fuel flow passage and located within the corresponding plurality of air flow passages, wherein the plurality of nozzle outlets are arranged circumferentially about the body.

The combustor of any preceding clause, further comprising multiple nozzle outlets arranged circumferentially about the body.

The combustor of any preceding clause, further comprising a first nozzle outlet and a second nozzle outlet, with the first nozzle outlet radially unaligned with the second nozzle outlet with respect to a longitudinal axis extending through the combustor.

The combustor of any preceding clause, further comprising a set of dilution holes in the combustor liner, wherein a first pair of adjacent dilution holes in the set of dilution holes are spaced to define a first axial distance with respect to a longitudinal axis extending through the combustor, and wherein a second pair of adjacent dilution holes in the set of dilution holes are spaced to define a second axial distance with respect to the longitudinal axis, wherein the second axial distance is larger than the first axial distance.

The combustor of any preceding clause, wherein the first pair of adjacent dilution holes is positioned axially forward of the second pair of adjacent dilution holes with respect to the longitudinal axis.

The combustor of any preceding clause, wherein a dilution hole in the set of dilution holes defines a major diameter and a minor diameter, with the minor diameter being smaller than the major diameter.

The combustor of any preceding clause, wherein a dilution hole in the set of dilution holes defines an angle with respect to the longitudinal axis, with the angle being between 10-90 degrees.

The combustor of any preceding clause, wherein a dilution hole in the set of dilution holes comprises a cross-sectional area that decreases along a downstream direction.

The combustor of any preceding clause, further comprising a deflector having a flat geometric profile.

The combustor of any preceding clause, wherein the deflector comprises a material having a high temperature capability.

The combustor of any preceding clause, wherein the deflector comprises at least one of ceramic or ceramic matrix composite.

A combustor for a turbine engine, comprising a combustor liner at least partially defining a combustion chamber, and a set of dilution holes in the combustor liner, wherein a first pair of adjacent dilution holes in the set of dilution holes are spaced to define a first axial distance with respect to a longitudinal axis extending through the combustor, and wherein a second pair of adjacent dilution holes in the set of dilution holes are spaced to define a second axial distance with respect to the longitudinal axis, wherein the second axial distance is larger than the first axial distance.

The combustor of any preceding clause, wherein the first pair of adjacent dilution holes is positioned axially forward of the second pair of adjacent dilution holes with respect to the longitudinal axis.

The combustor of any preceding clause, wherein a dilution hole in the set of dilution holes defines a major diameter and a minor diameter, with the minor diameter being smaller than the major diameter.

The combustor of any preceding clause, wherein a dilution hole in the set of dilution holes defines an angle with respect to the longitudinal axis, with the angle being between 10-90 degrees.

The combustor of any preceding clause, wherein a dilution hole in the set of dilution holes comprises a cross-sectional area that decreases along a downstream direction.

What is claimed is:

1. A turbine engine comprising:
a compressor section, a combustion section, and a turbine section in serial flow arrangement, with the combustion section including a combustor defining a longitudinal axis, the combustor comprising:
a combustor liner partially defining a combustion chamber; and
a set of dilution holes provided in the combustor liner, with the set of dilution holes arranged into pairs of adjacent dilution holes, with each pair of adjacent dilution holes being spaced to define a distance defined in one or both of an axial direction and a circumferential direction, relative to the longitudinal axis;
wherein, relative to the longitudinal axis, a first pair of adjacent dilution holes are positioned forward of a second pair of adjacent dilution holes, the first pair of adjacent dilution holes are spaced to define a first distance, and the second pair of adjacent dilution holes are spaced to define a second distance lesser than the first distance; and
wherein at least one dilution hole of the set of dilution holes is arranged at a non-orthogonal angle relative to the longitudinal axis.

2. The turbine engine of claim 1, wherein the set of dilution holes includes a plurality of pairs of adjacent dilution holes, wherein the distance defined by the plurality of pairs of adjacent dilution holes varies in a direction defined along the longitudinal axis.

3. The turbine engine of claim 2, wherein the distance of the plurality of pairs of adjacent dilution holes increases extending aft relative to the longitudinal axis.

4. The turbine engine of claim 2, wherein each dilution hole of the set of dilution holes defines a cross-sectional area, and wherein the cross-sectional area for the set of dilution holes decreases extending aft relative to the longitudinal axis.

5. The turbine engine of claim 4, wherein at least one dilution hole of the set of dilution holes includes an inlet cross-sectional area at an inlet of the dilution hole and an outlet cross-sectional area at an outlet of the dilution hole, and wherein the outlet cross-sectional area is less than the inlet cross-sectional area.

6. The turbine engine of claim 1, wherein the non-orthogonal angle is between 10-90 degrees relative to the longitudinal axis.

7. The turbine engine of claim 1, wherein each dilution hole of the pairs of adjacent dilution holes defines a diameter, wherein the distance for each pair of adjacent dilution holes is greater than the diameter of either dilution hole of each pair of adjacent dilution holes.

8. The turbine engine of claim 7, wherein at least one dilution hole of the pairs of dilution holes is non-circular, such that the diameter comprises a major diameter and a minor diameter, and wherein the distance among each pair of adjacent dilution holes is greater than the major diameter.

9. The turbine engine of claim 7, wherein the distance is at least two times greater than the diameter.

10. The turbine engine of claim 9, wherein the distance is between 2-100 times the diameter.

11. A turbine engine comprising:
a compressor section, a combustion section, and a turbine section in serial flow arrangement, and the combustion section having a combustor defining a longitudinal axis and comprising:
- a combustor liner partially defining a combustion chamber;
- a set of dilution holes provided in the combustor liner, with the set of dilution holes arranged into pairs of adjacent dilution holes, with each pair of adjacent dilution holes being spaced to define a distance;
- a deflector coupled to the combustor liner and partially defining the combustion chamber;
- a set of air-fuel nozzles arranged on the deflector, with each air-fuel nozzle of the set of air-fuel nozzles comprising:
  - a body having a nozzle outlet arranged on the deflector and the nozzle outlet fluidly coupled to the combustion chamber;
  - an air flow passage located within the body and having an air outlet at least partially defining the nozzle outlet; and
  - a fuel flow passage located within the air flow passage and having a fuel outlet at least partially defining the nozzle outlet, and
  - wherein at least one dilution hole of the set of dilution holes is arranged at a non-orthogonal angle relative to the longitudinal axis.

12. The turbine engine of claim 11, wherein the air flow passage defines an air passage width that decreases along the air flow passage toward the air outlet, and wherein the fuel flow passage defines a fuel passage width that increases along at least a portion of the fuel flow passage extending toward the fuel outlet.

13. The turbine engine of claim 12, wherein the fuel passage width decreases along a portion of the fuel flow passage aft of the portion that increases toward the fuel outlet.

14. The turbine engine of claim 11, wherein the distance for each pair of adjacent dilution holes of the set of dilution holes increases extending aft, relative to the longitudinal axis.

15. The turbine engine of claim 14, wherein the distance is defined in at least one of an axial direction or a circumferential direction, relative to the longitudinal axis.

16. The turbine engine of claim 11, wherein each dilution hole of the set of dilution holes defines a cross-sectional area, and wherein the cross-sectional area for the set of dilution holes decreases extending aft, relative to the longitudinal axis.

17. The turbine engine of claim 11, wherein the set of air-fuel nozzles includes at least two spaced air-fuel nozzles, being spaced in a radial direction defined relative to the longitudinal axis.

18. The turbine engine of claim 17, wherein the at least two radially-spaced air-fuel nozzles are unaligned, but at least partially overlap one another in a direction extending from the longitudinal axis.

19. The turbine engine of claim 11, wherein the deflector has a flat geometric profile.

20. The turbine engine of claim 11, wherein the deflector comprises at least one of ceramic or ceramic matrix composite.

* * * * *